Nov. 29, 1932.   M. TIBBETTS   1,889,577
MOTOR VEHICLE
Filed Aug. 4, 1928
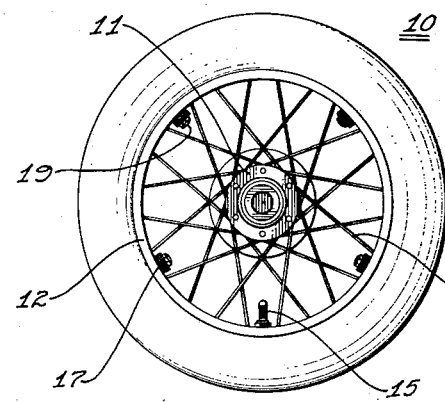
FIG. 1
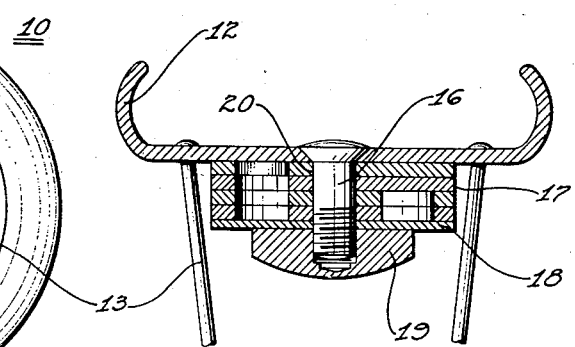
FIG. 2
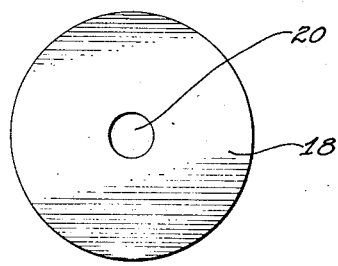
FIG. 3
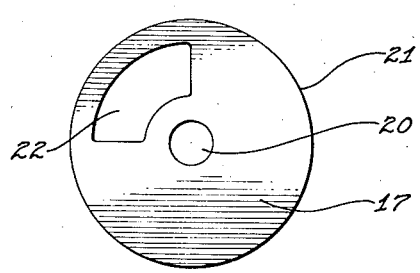
FIG. 4
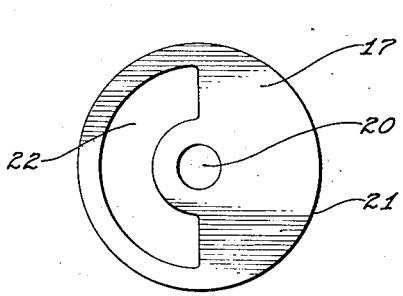
FIG. 5
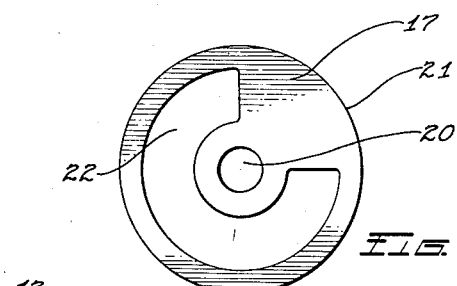
FIG. 6
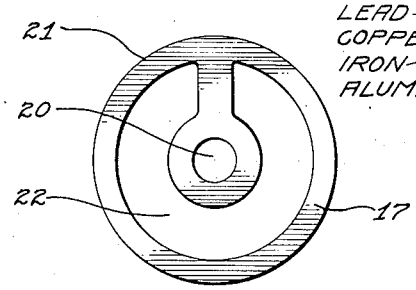
FIG. 7
LEAD
COPPER
IRON
ALUMINUM
FIG. 8
Inventor
Million Tibbetts Patented Nov. 29, 1932

1,889,577

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed August 4, 1928. Serial No. 297,501.

This invention relates to motor vehicles and more particularly to motor vehicle wheels.

Motor vehicle wheels and the associated tires have certain portions heavier than other portions. Particularly is this true of motor vehicle wheels equipped with the conventional pneumatic tires having valve stems extending through the rims or felloes of the wheels. These variances in weight or the unbalanced forces cause the wheels to rotate irregularly and the uneven rotation of the wheels frequently results in a shimmy. The present invention aims to overcome this objection by balancing the unbalanced forces of the wheel to insure the smooth and regular rotation thereof.

An object of the invention is to balance the unbalanced forces of a motor vehicle wheel.

Another object of the invention is to provide a simple and reliable means whereby a wheel may be easily, quickly and economically balanced.

Another object of the invention is to provide a variable weight including a plurality of objects of the same general contour but of different weights, the objects having registering axial bores adaptable for the reception of a retaining member by means of which they are secured together to present a symmetrical outline.

Another object of the invention is to provide means whereby a wheel may be brought to a proper balance by suitable weights arranged to compensate for the unbalanced forces.

A further object of the invention is to provide means whereby a wheel may be brought to a proper balance by a plurality of weights spaced apart on the felloe of the wheel, each weight being variable to compensate for the unbalanced forces.

A further object of the invention is to attain the proper balance of a wheel by a plurality of variable weights spaced apart on the inner periphery of the felloe of the wheel and arranged so that adjustment may be readily made to obtain a correct balance of the wheel without disassembly.

A still further object of the invention is to attain the proper balance of a wheel by providing a plurality of weights positioned on the inner periphery of the felloe of the wheel, each weight comprising a plurality of washers having portions removed therefrom in the zones between the axial bores of the washers and the peripheries thereof so that they may be varied in weight and yet retain the same general contour.

Yet a further object of the invention is to provide a plurality of washers having the same general contour and different weights whereby the washers may be positioned in groups to compensate for the unbalanced forces of the wheel and the tire mounted thereon.

Other objects of the invention will appear from the following description taken in connection with the drawing which form a part of this specification, and in which:

Figure 1 is a side elevation of a motor vehicle wheel embodying the invention,

Figure 2 is a cross sectional view through the felloe and one of the balancing devices, Figure 3 is a plan view of the cover plate, Figures 4, 5, 6 and 7 are plan views of washers having portions removed therefrom in the zones between their axial bores and peripheries, the areas of the removed portions being of greater or less extent, and Figure 8 is a modified form of the invention.

Referring to the drawing for more specific details of the invention, 10 represents generally a motor vehicle wheel. As shown, the wheel comprises a hub 11, a felloe or rim 12 and wire spokes 13 connecting the hub and rim or felloe. A pneumatic tire 14 is mounted on the rim and provided with the conventional inner tube, the valve stem of which is indicated at 15.

Positioned on the inner periphery of the felloe or rim 12 is a plurality of studs 16, suitably spaced with respect to each other and the valve stem. The studs 16 each support a plurality of washers 17 and a cover plate 18 and a nut 19 is threaded on each stud to secure the washers and cover plates in position. As shown, the washers have the usual axial bore 20 adaptabl for the reception of the studs 16 and portions of the washers between the axial bores 20 and the peripheries 21 are removed. The portion removed is varied according to the weight desired.

In the preferred embodiment of the invention, the washers which are equal in diameter and thickness have alike axial bores and have had removed therefrom in the zones between the axial bores and peripheries thereof arcuate sections or portions leaving in the washers arcuate slots 22 ranging from one-quarter of a circle to substantially a complete circle so that the weights of the washers are varied according to the dimensions of the portions removed or the size of the slots. In assembling the washers the total weight of the assembly may be easily and quickly varied by the use of washers of various weights depending entirely upon the amount of weight required to compensate for the unbalanced forces of the wheel and tire mounted thereon.

In the modified form of the invention illustrated in Fig. 8 the washers 23 are equal in diameter and thickness and have alike axial bores but differ in weight. As shown, these washers are made up respectively of lead, copper, iron and aluminum, it being well known that each of these metals have a different specific gravity, hence in assembling the washers, variance in the weight of the respective assemblies may be attained by assembling together washers of the same or different specific gravity. The proper balance of the wheel may be readily attained by assembling a plurality of these washers, the total weight of which when properly positioned, is sufficient to compensate for the unbalanced forces.

Although this invention has been described in connection with certain specific embodiments the principles involved are susceptible of numerous other applications as will readily occur to persons skilled in the art. The invention is, therefore, to be limited only as indicated by the scope of the appended claims.

Having thus described the various features of my invention, what I claim as new and desire to secure by Letters Patent is:

1. In a balancing device for a wheel, a stud on the wheel, a plurality of washers having unbroken peripheries and alike axial bores of a diameter to fit closely on the stud, said washers being of the same diameter and thickness and having arcuate slots therein of such character as to vary the weights of the washers, and means for clamping the washers together axially on the stud.

2. In a balancing device for a wheel, a stud on the wheel, a plurality of washers having unbroken peripheries and axial bores of a diameter to fit closely on the stud, said washers having slots therein of such character as to vary the weights of the washers, and means for clamping the washers together axially on the stud.

In testimony whereof I affix my signature.

MILTON TIBBETTS.